3,062,852
ESTERS OF 2,2,4,4-TETRAALKYLCYCLO-
BUTANE-1,3-DIOLS
James C. Martin and Kent C. Brannock, Kingsport, Tenn., assignors to Eastman Kodak Company, Rochester, N.Y., a corporation of New Jersey
No Drawing. Filed Mar. 30, 1960, Ser. No. 18,465
9 Claims. (Cl. 260—410)

This invention relates to a new group of ester compounds that have been found to have high thermal and hydrolytic stability.

It is an object of this invention to provide a new group of ester materials that have utility as synthetic lubricants.

It is another object of this invention to provide a novel class of synthetic ester lubricants having improved resistance to thermal degradation.

It is another object of this invention to provide new synthetic ester lubricants especially adapted to meet the high temperature requirements desired for lubricating turbo-jet engines and for related high temperature uses.

It is likewise an object of this invention to provide cellulose ester resins plasticized with a new group of ester plasticizers.

It is another object of this invention to provide new ester plasticizers for cellulose ester resins having low volatility, resistance to water leaching and hydrolysis, and compatibility with cellulose ester resins.

These and other objects of the invention are accomplished by means of this invention as described more fully hereinafter with reference to preferred embodiments thereof.

The novel class of compounds embodying the invention are esters of 2,2,4,4-tetraalkylcyclobutane-1,3-diol having the following structural formula:

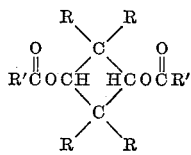

wherein R is a lower alkyl radical having 1 to 4 carbon atoms and preferably 1 to 2 carbon atoms, and wherein R' is a hydrogen atom, a phenyl radical, or an alkyl radical typically having 1 to 18 carbon atoms and preferably 1 to 12 carbon atoms. The alkyl substituents can be either straight or branched chain alkyl groups. Typical esters of the invention include such compounds as:

2,2,4,4-tetramethylcyclobutane-1,3-diol diformate
2,2,4,4-tetramethylcyclobutane-1,3-diol diacetate
2,2-dimethyl-4,4-diethylcyclobutane-1,3-diol diisobutyrate
2,2,4,4-tetraethylcyclobutane-1,3-diol di-n-hexanoate
2,2,4,4-tetramethylcyclobutane-1,3-diol dibenzoate
2,2,4,4-tetramethylcyclobutane-1,3-diol di-n-heptanoate
2,2,4,4-tetramethylcyclobutane-1,3-diol bis(2-ethyl hexanoate)
2,2,4,4-tetramethylcyclobutane-1,3-diol dipelargonate
2,2,4,4-tetra-n-butylcyclobutane-1,3-diol dipelargonate
2,2,4,4-tetramethylcyclobutane-1,3-diol mono-n-hexanoate monopelargonate
2,4-dimethyl-2,4-diethylcyclobutane-1,3-diol dipelargonate
2,2,-dimethyl-4,4-diethylcyclobutane-1,3-diol bis(2-methyl-n-octanoate)
2,2,4,4-tetra-n-butylcyclobutane-1,3-diol diacetate
2,2,4,4-tetraethylcyclobutane-1,3-diol dipelargonate
2,2,4,4-tetraisopropylcyclobutane-1,3-diol diformate
2,2,4,4-tetramethylcyclobutane-1,3-diol di-n-decanoate
2,2,4,4-tetramethylcyclobutane-1,3-diol di-n-undecanoate
2,2,4,4-tetramethylcyclobutane-1,3-diol di-n-dodecanoate
2,2,4,4-tetramethylcyclobutane-1,3-diol di-n-tridecanoate
2,2,4,4-tetramethylcyclobutane-1,3-diol butyrate dodecanoate
2,2,4,4-tetramethylcyclobutane-1,3-diol di-myristate
2,2,4,4-tetraethylcyclobutane-1,3-diol di-palmitate
2,2,4,4-tetramethylcyclobutane-1,3-diol di-nonadecanoate.

The esters of the present invention can be prepared by esterifying one molar proportion of a 2,2,4,4-tetraalkylcyclobutane-1,3-diol with two molar proportions of a suitable monocarboxylic acid. A single monocarboxylic acid or mixtures of more than one monocarboxylic acid can be used to esterify the subject diols. This esterification reaction can be effected at a temperature of about 175° to 250° C. At such reaction temperatures the esterification can be effected in the absence of an esterification catalyst. However, lower reaction temperatures can be employed with catalytic amounts of such esterification catalysts as zinc chloride, sulfuric acid and hydrochloric acid. Other well-known esterification methods can also be employed including the use of a carboxylic acid chloride or anhydride in lieu of a carboxylic acid reactant.

The prepartion of 2,2,4,4-tetraalkylcyclobutane-1,3-diols from the corresponding diones by hydrogenation in the presence of ruthenium is described in detail in the copending application of Hasek and Elam U.S. Serial No. 728,083 now U.S. Patent 2,936,324 which was filed April 14, 1958.

The subject ester materials can be employed as lubricating oils. Hydrocarbon or mineral lubricating oils are widely used as lubricants, but such materials suffer from certain disadvantages which limit their use in many applications. In particular, hydrocarbon oils undergo marked viscosity changes with changes in temperature and have relatively high pour points when they have a usable viscosity at high temperatures. Hydrocarbon lubricating oils having low pour points usually contain a considerable amount of volatile material which is lost at high temperatures. Hydrocarbon lubricating oils particularly suffer where extreme conditions of temperature are encountered, such as in turbo-jet aircraft engines. High engine temperatures in turbo-jet aircraft engines and the like are desirably employed to increase engine efficiency. In such a high temperature use, conventional lubricating oils suffer thermal and oxidative breakdown to an undesirable degree. The esters of the invention are not subject to many of the disadvantages inherent to hydrocarbon lubricating oils. In addition, the esters of the invention have improved properties with respect to thermal and hydrolytic stability not possessed by many known ester materials that are being employed as synthetic lubricants. That the esters of the invention have high thermal stability was quite unexpected because the diols from which these esters are prepared contain only secondary alcohol groups, and one would expect the esters of such diols to have relatively low thermal stability.

By varying the choice of the carboxylic acid with which the 2,2,4,4-tetraalkylcyclobutane-1,3-diol is esterified, as well as by varying the choice of the alkyl substituent in the 2 and 4 positions on the cyclobutane ring, lubricants having a diversity of viscosities and pour points can be obtained. Esters of 2,2,4,4-tetraalkylcyclobutane-1,3-diols wherein the carboxylic acid moiety has 6 to 13 carbon atoms and preferably 8 to 13 carbon atoms can be employed as lubricant materials. The esters of the invention can be used directly as lubricants or they can be blended with other lubricating materials. If desired, minor proportionate amounts of such conventional additives as antioxidants, extreme pressure additives, viscosity index modifiers, thickeners, anti-corrosion agents and related materials can be incorporated into the present esters. While the subject esters can be utilized as lubricants without additives, illustrative lubricating compositions including the present esters include: 96% 2,2,4,4-tetramethylcyclobutane-1,3-diol dipelargonate, 3% tricresyl phosphate and 1% phenothiazine; 98% 2,2,4,4-tetramethylcyclobutane-1,3-diol bis(2-ethyl hexanoate), .07% by weight phosphorus acid and 1.93% by weight 2,6-ditertiarybutyl-p-cresol; 50% bis(2-ethylhexyl)sebacate and 50% 2,2,4,4-tetramethylcyclobutane-1,3-diol dipelargonate; and other related blends or mixtures.

The subject esters also have utility as plasticizers for plastic compositions containing cellulose ester resins. It is common practice in the art to modify the properties of cellulose ester resins by the addition of various materials having a plasticizing or softening action. It is a requisite of good plasticizing materials that they have such properties as low volatility, water resistance and compatibility with the resin being plasticized. Low boiling plasticizers evaporate slowly on standing at room temperature or at temperatures to which the cellulose ester resin is subjected to, either in preparation or in use. As a result, films or molded articles thereof become brittle and may easily crack or break. Also, resins may be subjected to water in their use. If the plasticizer is water soluble, the plasticizer is ultimately leached out. If the plasticizer is not compatible in the proportions generally utilized in cellulose ester resins, the plasticizer either can not be effectively incorporated therein or it will exude from films and molded articles thereof to give an oily feel to these articles. Here again, loss of the plasticizer material from the resin results in a reversion to the resins original hardness and brittleness. The esters of the invention have low volatility, are insoluble in water and are compatible with cellulose ester resins, and hence, are effective plasticizer materials for cellulose ester resins.

Cellulose esters that can be plasticized with the esters of the invention include the normally solid resinous cellulose esters of saturated fatty acids having 2 to 4 carbon atoms such as cellulose acetate butyrate, cellulose acetate propionate and the like. Esters of 2,2,4,4-tetraalkylcyclobutane-1,3-diol wherein the carboxylic acid moiety has 2 to 13 carbon atoms and preferably 2 to 10 carbon atoms can be used as cellulosic resin plasticizers. A preferred cellulosic resin that can be suitably plasticized in accordance with the invention is cellulose acetate butyrate. Suitable cellulose acetate butyrate resins typically have a 5 to 20% acetyl content and a 25 to 50% butyryl content. The esters of the invention are used in cellulose esters as plasticizers at concentrations of about 5 to 40%, with concentrations of about 5 to 30% being preferably used. The aforementioned concentrations are based on the combined weight of the cellulosic resin and the plasticizer.

The esters of the invention can be incorporated into cellulosic resins as plasticizers therefor by conventional methods. A preferred method of incorporation is blending by milling on heated rolls.

In addition to being useful as synthetic lubricants and as plasticizers, the esters of the invention also have utility as heat transfer oils, hydraulic fluids and for other uses requiring materials having such properties as high thermal and hydrolytic stability, high boiling point, high flash point, good temperature-viscosity characteristics, water insolubility and related properties inherent to the novel esters of the invention.

As used herein, the term "2,2,4,4-tetraalkylcyclobutane-1,3-diol" is equivalent to the terms "2,2,4,4-tetraalkyl-1,3-cyclobutanediol" and "2,2,4,4-tetraalkylcyclobutanediol-1,3." The present invention concerns diesters of this diol.

The invention is further illustrated by the following examples which include the preparation of typical esters of the invention, as well as various properties and uses of such esters.

EXAMPLE 1

A solution of 72 g. (0.5 mole) of 2,2,4,4-tetramethylcyclobutane-1,3-diol, 146 g. (1.02 moles) of 2-ethylhexanoic acid and 100 ml. of toluene was distilled under a 10 inch packed column topped with a Dean-Stark tube. Toluene was removed until the base heater temperature reached 190° C. The resulting solution was allowed to reflux and water was removed azeotropically. After refluxing for 3 days, 16 ml. of water separated out and the base temperature had risen to 205° C. The resulting residue was cooled to room temperature, washed with dilute sodium bicarbonate solution, dried over sodium sulfate and then stripped of low boilers under vacuum. The resulting residue was then distilled by molecular distillation and a fraction distilled at a temperature of 92° to 96° C. under a pressure of 105 microns of mercury to give 152 g. of 2,2,4,4-tetramethylcyclobutane-1,3-diol bis-(2-ethylhexanoate). The prepared ester product had the following analysis based on the empirical formula, $$C_{24}H_{44}O_4$$

Percent C (found)=72.56, percent C (calculated)=72.7
Percent H (found)=10.92, percent H (calculated)=11.1
Saponification Equivalent (found)=205
Saponification Equivalent (calculated)=198

EXAMPLE 2

A 450 g. (4.4 moles) portion of acetic anhydride and 2 g. of anhydrous zinc chloride were added to 296.5 g. (2.06 moles) of 2,2,4,4-tetramethylcyclobutane-1,3-diol. The resulting mixture began to reflux spontaneously and all of the diol dissolved within a few minutes. The mixture was allowed to stand for about 15 hours, refluxed for 2 hours, cooled to room temperature and then filtered. The acetic acid in the resulting mixture was removed by distillation and thereafter 431 g. of 2,2,4,4-tetramethylcyclobutane-1,3-diol diacetate was distilled off at a temperature of 110° to 112° C. under a pressure of 13 mm. of mercury. This ester material had the following analysis based on the empirical formula, $C_{12}H_{20}O_4$. 

Saponification Equivalent (found)=114.5
Saponification Equivalent (calculated)=114

EXAMPLE 3

A solution of 72 g. (0.5 mole) of 2,2,4,4-tetramethylcyclobutane-1,3-diol, 1 g. of anhydrous zinc chloride and 300 g. (1.1 moles) of 2-ethylhexanoic anhydride was heated at 190° to 200° C. for 18 hours. The resulting reaction mixture was washed first with sodium bicarbonate solution and then with water, and thereafter dried over anhydrous sodium sulfate. Low boilers were removed by distillation and thereafter 165 g. of 2,2,4,4-tetramethylcyclobutane-1,3-bis(2-ethyl hexanoate) was distilled off by molecular distillation at a temperature of 56° to 57° C. under a pressure of 4 microns of mercury.

EXAMPLE 4

A 61 g. (0.423 mole) portion of 2,2,4,4-tetramethylcyclobutane-1,3-diol and 134 g. (0.846 mole) of pelargonic acid were reacted and processed as described in Example 1 to give the ester, 2,2,4,4-tetramethylcyclobutane-1,3-diol dipelargonate, boiling at 190° to 201° C. under a pressure of 0.4 mm. of mercury.

EXAMPLE 5

A solution of 104 g. (0.605 mole) of 2,4-dimethyl-2,4-diethylcyclobutane-1,3-diol, 191 g. (1.21 moles) of pelargonic acid and 100 ml. of xylene was reacted and processed as described in Example 1 to give 2,4-dimethyl-2,4-diethylcyclobutane-1,3-diol dipelargonate.

EXAMPLE 6

A solution of 51.5 g. (0.25 mole) of 2,2,4,4-tetraethylcyclobutane-1,3-diol, 77 g. (0.488 mole) of pelargonic acid and 50 ml. of xylene was reacted and processed as described in Example 1 to give 2,2,4,4-tetraethylcyclobutane-1,3-diol dieplargonate.

EXAMPLE 7

A solution of 321 g. (2.23 moles) of 2,2,4,4-tetramethylcyclobutane-1,3-diol, 276 g. of formic acid (6 moles) and 200 ml. of benzene was refluxed for 5 hours. The reaction solution was cooled, 276 g. of formic acid was added and refluxing was continued for 4 hours. Upon cooling, the solution was diluted with benzene, washed with water, diluted with sodium bicarbonate solution, again washed with water and finally dried over anhydrous sodium sulfate. The resulting organic layer was distilled through a 48 inch packed column to give 315 g. (70% yield) of 2,2,4,4-tetramethylcyclobutane-1,3-diol diformate, B.P. 132–133° C. (53 mm). The prepared diester had a purity of 98% as determined by gas chromatography.

EXAMPLE 8

A solution of 650 g. (4.5 moles) of 2,2,4,4-tetramethylcyclobutane-1,3-diol and 3 g. of zinc chloride in 1500 g. (9.5 moles) of isobutyric anhydride was refluxed for 6 hours. Distillation of this reaction product gave isobutyric acid, isobutyric anhydride and 1204.7 g. (94% yield) of 2,2,4,4-tetramethylcyclobutane-1,3-diol diisobutyrate, B. P. 135° C. (5.5 mm.), $n_D^{20}$ 1.4397. The ester product had the following analysis based on the empirical formula $C_{16}H_{28}-O^4$:

Found: C, 67.4%; H, 10.1%. Sapon. Equiv.=142.1. Calculated: C, 67.6%; H, 9.9%. Sapon. Equiv.=142.

EXAMPLE 9

A solution of 650 g. (4.5 moles of 2,2,4,4-tetramethylcyclobutane-1,3-diol and 3 g. of zinc chloride in 1500 g. (9.5 moles) of n-butyric anhydride was reacted as described in Example 8 to give 1130.6 g. (88% yield) of 2,2,4,4-tetramethylcyclobutane-1,3-diol di-n-butyrate, B.P. 135° C. (5.5 mm.), $n_D^{20}$ 1.4397. The ester product had the following analysis based on the empirical formula $C_{16}H_{28}O_4$:

Found: C, 67.5%; H, 10.0%. Sapon. Equiv.=142.5. Calculated: C, 67.6%; H, 9.9%. Sapon. Equiv.=142.

EXAMPLE 10

A solution of 144 g. (1 mole) of 2,2,4,4-tetramethylcyclobutane-1,3-diol in 166 g. (2.1 moles) of pyridine and 1000 ml. of toluene was stirred and refluxed while 288 g. (2.05 moles) of benzoyl chloride was added over at 1 hr. period. Refluxing was continued for 6 hours. After cooling, the reaction solution was washed with water, dilute sodium hydroxide solution, again with water and finally dried over anhydrous sodium sulfate. The organic layer was evaporated on the steam bath to give 333.9 g. (I) of crude 2,2,4,4-tetramethylcyclobutane-1,3-diol dibenzoate that was partly crystalline. (I) was filtered by suction to remove as much liquid as possible; then the solid was washed with cold hexane and dried to give 154.6 g. (II), M.P. 128–134° C. The filtrate was evaporated to dryness to yield 168.3 g. (III) of a viscous residue. (II) was recrystallized from hexane to give 138.6 g. (IV) of trans-2,24,4-tetramethylcyclobutane-1,3-diol, dibenzoate, M.P. 134.5–135° C. (III) was distilled through a 6-in. Vigreux column to give 141.6 g. (V), B.P. 196–199° C. (1.5 mm.) of cis rich 2,2,4,4-tetramethylcyclobutane-1,3-diol dibenzoate. (V) was a viscous liquid that turned solid after standing for several days.

Anal. of (IV).—Calcd. for $C_{22}H_{24}O_4$: C, 75.0; H, 6.8. Sapon. Equiv.=176. Found: C, 75.1; H, 6.9. Sapon. Equiv.=176.3.

Anal. of (V).—Calcd. for $C_{22}H_{24}O_4$: C, 75.0; H, 6.8. Found: C, 75.2; H, 6.9.

EXAMPLE 11

Esters of the present diol can be prepared wherein the acyl moiety is composed of two different radicals. To a stirred, refluxing solution of 144 g. (1 mole) of 2,2,4,4-tetramethylcyclobutane-1,3-diol in 250 ml. of pyridine was added 106.5 g. (1 mole) of butyryl chloride over a period of 30 min. The reaction solution was refluxed for 4 hr. After cooling, 800 ml. of benzene was added and the layers were separated. The organic layer was washed with water and then dried over anhydrous magnesium sulfate. Distillation of this material through a 15-in. packed column yielded 96.5 g. (45%) of 2,2,4,4-tetramethylcyclobutane-1,3-diol, monobutyrate, B.P. 134–137° C. (13 mm.), $n_D^{20}$ 1.4493. The prepared monoester product had the following analysis based on the empirical formula, $C_{12}H_{22}O_3$:

Found: C, 67.25%; H, 10.23%. Calculated: C, 67.3%; H, 10.3%.

To a stirred, refluxing solution of 75 g. (0.35 mole) of 2,2,4,4-tetramethylcyclobutane-1,3-diol, monobutyrate and 31.6 g. (0.4 mole) of pyridine in 200 ml. of toluene was added 78.7 g. (0.36 mole) of dodecanoyl chloride over a period of 30 min. The reaction mixture was refluxed for 4 hr. After cooling, it was washed with water and the organic layer was dried over anhydrous magnesium sulfate. Distillation of this material in a molecular still gave 99.3 g. (72%) of the diester, 2,2,4,4-tetramethylcyclobutane-1,3-diol, butyrate dodecanoate, B.P. 85–94° C. (55–60μ), $n_D^{20}$ 1.4489. The prepared diester product of the invention had the following analysis based on the empirical formula, $C_{24}H_{44}O_4$:

Found: C, 73.13%; H, 11.4%. Calculated: C, 72.9%; H, 11.1%.

EXAMPLE 12

The esters of the invention are particularly characterized as having good thermal stability, a property desired of synthetic lubricant materials. The improved stability of 2,2,4,4-tetramethylcyclobutane-1,3-diol dipelargonate prepared as described in Example 4 and 2,2,4,4-tetramethylcyclobutane-1,3-diol bis(2-ethylhexanoate) prepared as described in Example 1 is illustrated by the data set out in Table A below. For purposes of comparison, data concerning 1,4-butanediol bis(2-ethylhexanoate), 2,2,4-trimethyl-1,3-pentanediol bis(2-ethylbutyrate), the well-known commercial synthetic lubricant, bis(2-ethylhexyl)sebacate, and another known synthetic lubricant, 2,2,4-trimethyl-1,3-pentanediol dipelargonate, are also included in Table A.

Table A

| Ester | Percent Decomposition per Hour at 575° F. | Percent Change in 100° F. Viscosity After 8 Hour Heating at 575° F. |
| --- | --- | --- |
| (a) 2, 2, 4, 4-Tetramethylcyclobutane-1, 3-diol bis(2-ethylhexanoate) | 0.01 | 1.07 |
| (b) 2, 2, 4, 4-Tetramethylcyclobutane-1, 3-diol dipelargonate | 0.06 | 1.8 |
| (c) 1, 4-Butanediol bis(2-ethylhexanoate) | 0.47 | 5.6 |
| (d) Bis(2-ethylhexyl) sebacate | 0.59 | 17 |
| (e) 2, 2, 4-Trimethyl-1, 3-pentanediol dipelargonate | ¹1.09 | ¹16 |
| (f) 2, 2, 4-Trimethyl-1, 3-pentanediol bis(2-ethylhexanoate) | 0.63 | 32.8 |

¹ Determined at 550° F.

The data in Table A concerning the percent decomposition per hour of the various esters was determined by heating 30 ml. samples of the esters in a "Pyrex" tube fitted with a reflux condenser for 8 hours at 575° F. An inert atmosphere was maintained by bubbling nitrogen through the respective ester samples at a rate of one liter per hour. The acid numbers of the ester samples were determined every 2 hours. From this data the rate of decomposition of the ester to the acid was calculated. The viscosity determinations upon which the percent changes of 100° F. viscosity in Table A were based were determined by A.S.T.M. Method D–88–44. For use in jet engine lubricants, a rate of decomposition greater than 0.1% per hour is objectionable.

EXAMPLE 13

An ester of the invention, 2,2,4,4-tetramethylcyclobutane-1,3-diol dipelargonate, prepared as described in Example 4, had the following properties that lend to its utility as a synthetic lubricant:

| | |
|---|---|
| Viscosity, cs. at 100° F. | 13.58 |
| Viscosity, cs. at 210° F. | 3.34 |
| A.S.T.M. Slope (100° to 210° F.) | 0.72 |
| Evaporation weight loss, 6.5 hours at 400° F. percent | 27.1 |

EXAMPLE 14

An ester of the invention, 2,4-dimethyl-2,4-diethyl-cyclobutane-1,3-diol dipelargonate, prepared as described in Example 5, had the following properties that lend to its utility as a synthetic lubricant, and which properties compare favorably with the specifications advanced by the United States Air Force in Military Specification, "Lubricating Oil, Aircraft Turbine Engine, Synthetic Base," MIL-L-7808-C, November 1955:

| | |
|---|---|
| Viscosity, cs. at −65° F. | 23,933 |
| Viscosity, cs. at 100° F. | 18.26 |
| Viscosity, cs. at 210° F. | 3.92 |
| Pour point °F. | <−75 |
| Evaporation loss at 400° F. for 6.5 hours percent | 21.4 |

EXAMPLE 15

The hydrolytic stability of esters of 2,2,4,4-tetraalkylcyclobutane-1,3-diols is very high. The rate of hydrolysis of these esters in hot water is so slow that this rate cannot be used as a practical measure of stability. Hence, the hydrolytic stability of the present esters was determined under more drastic alkaline hydrolysis conditions. Samples of the 2-ethyl hexanoic acid diester of 2,2,4,4-tetramethylcyclobutane-1,3-diol prepared as described in Example 1, and the corresponding 2-ethyl hexanoic acid diester of 2,2-dimethyl-1,3-propanediol, were refluxed in a 0.5 N solution of sodium hydroxide in 90% methanol, to which pyridine was added to obtain a homogeneous reaction mixture. Periodically, samples were removed, the excess alkali titrated with standard acid, and the amount of alkali consumed in the saponification calculated by difference. After 7 hours of refluxing the 2,2-dimethyl-1,3-propanediol bis(2-ethyl hexanoate) was completely hydrolyzed, the 2,2,4,4-tetramethylcyclobutane-1,3-diol bis(2-ethyl hexanoate) of the invention taking 48 hours to completely hydrolyze. The ester of 2,2-dimethyl-1,3-propanediol that was compared with the ester of the invention is described in Bell et al. U.S. Patent No. 2,798,083 and has been regarded as having good resistance to hydrolysis.

EXAMPLE 16

Eighty parts by weight of cellulose acetate butryate (about 13% acetyl content and about 37% butyryl content) and 20 parts by weight of 2,2,4,4-tetramethylcyclobutane-1,3-diol bis(2-ethyl hexanoate) prepared as described in Example 1 were substantially uniformly mixed on heated rolls, extruded into sheets about 0.006 inch in thickness, and then granulated. The granulated product was then molded on an injection press into various molded objects. These molded articles had high impact strength, good resistance to thermal degradation, and low hydrolytic breakdown as measured by molecular weight lowering during prolonged exposure to hot water. The plasticizer in the cellulose acetate butyrate resin showed high resistance to extraction by water. Eighty parts by weight of the cellulose acetate butyrate is similarly plasticized with 20 parts by weight of 2,2,4,4-tetraethylcyclobutane-1,3-diol dipelargonate prepared as described in Example 6. While the 2,2,4,4-tetramethylcyclobutane - 1,3 - diol bis(2-ethyl hexanoate) plasticizer was compatible with and could be readily incorporated in the cellulose acetate butyrate, this plasticizer was found not to be compatible with a polyvinyl chloride resin ("Geon 101," B. F. Goodrich Company) and could not be incorporated therein in the usual plasticizing amounts. The high thermal and hydrolytic stability of the subject esters illustrated in the preceding examples also makes the present esters desirable plasticizers for cellulosic resins. When the esters of the invention are incorporated into cellulosic resins as plasticizers they do not break down under the same thermal conditions that cause some plasticizers to be degraded. In the commercial molding of cellulosic resins, some waste or scraps are obtained which cannot be remelted and molded again if degradation of the plasticizer has occurred. Hence, the thermally stable esters of the invention have considerable utility as plasticizers.

EXAMPLE 17

A sample of cellulose acetate butyrate (about 13% acetyl content and about 37% butyryl content) plasticized with 20% by weight of 2,2,4,4-tetramethylcyclobutane-1, 3-diol bis(2-ethyl hexanoate) as described in Example 16 was compared with a sample of the cellulose acetate butyrate plasticized with 20% by weight of di-n-butyl sebacate. Both samples were exposed to 100% relative humidity at 110° C. for 15 days. The results of the exposure test are summarized by the data in Table B below in terms of change of inherent viscosities of the respective samples.

Table B

| Plasticizer | Inherent Viscosity, Before Exposure | Inherent Viscosity, After Exposure |
|---|---|---|
| (a) 2, 2, 4, 4-Tetramethylcyclobutane-1, 3-diol bis(2-ethyl hexanoate) | 1.51 | 1.24 |
| (b) Di-n-butyl sebacate | 1.49 | <0.05 |

EXAMPLE 18

A series of samples of cellulose acetate butyrate (about 13% acetyl content and about 37% butyryl content) having varying amounts of 2,2,4,4-tetramethylcyclobutane-1,3-diol bis(2-ethyl hexanoate) prepared as described in Example 1 incorporated therein as a plasticizer were subjected to several conventional tests to determine the physical properties thereof. The results of the various tests are summarized by the data set out in Table C below. The amount of plasticizer is indicated in Table C as percent by weight based on the total weight of the plasticizer and the cellulose acetate butyrate.

Table C

AMOUNT OF 2,2,4,4-TETRAMETHYLCYCLOBUTANE-1,3-DIOL BIS(2-ETHYL HEXANOATE) PLASTICIZER

| Property | 8.5% | 25% |
|---|---|---|
| Rockwell hardness at 72° F | 15X-77 | 15X-40.5 |
| Distortion under heat 66 p.s.i. ° F | 121-134 | 101-108 |
| Izod impact strength −40° F | .78 | 1.08 |
| Izod impact strenght 72° F | .78 | 2.1 |
| Tensile strength (fracture) 72° F | 5,270 | 4,380 |
| Elongation at 72° F | 10 | 60 |
| Modulus of elasticity p.s.i.×10⁵ | 2.0 | 1.33 |
| Stiffness p.s.i.×10⁵ | 1.07 | .82 |
| Tensile strentgh (upper yield) 72° F | 6,120 | 3,820 |
| Volatility (weight loss in percent after 24 hr. at 110° C.) | 1.06 | 1.35 |
| Volatility (weight loss in percent after 48 hr. at 100° C.) | 1.14 | 1.62 |

EXAMPLE 19

A series of samples of cellulose acetate butyrate (about 13% acetyl content and about 37% butyryl content) having varying amounts of the diisobutyrate, the di-n-butyrate and the diacetate esters of 2,2,4,4-tetramethylcyclobutane- 1,3-diol incorporated therein as plasticizers were subjected to several conventional tests to determine the physical properties thereof. The results of the various tests are summarized by the data set out in Table D below. The amount of plasticizer is indicated in Table D as percent by weight based on the total weight of the plasticizer and the cellulose acetate butyrate.

Table D

AMOUNT OF 2,2,4,4-TETRAMETHYLCYCLOBUTANE-1,3-DIOL DIESTER PLASTICIZER

| Property | Diisobutyrate | | Di-n-butyrate | | Diacetate | |
|---|---|---|---|---|---|---|
| | 15% | 25% | 15% | 25% | 15% | 25% |
| Elongation percent (72° F.) | 40 | 60 | 60 | 70 | 50 | 60 |
| Izod impact strength (72° F.) | 1.9 | 4.0 | 3.3 | 4.0 | 3.1 | 3.1 |
| Tensile strength (p.s.i., at fracture, 72° F., 50% R.H.) | 5,360 | 4,760 | 5,938 | 4,670 | 6,030 | 4,950 |
| Modulus of elasticity (p.s.i.×10⁵) | 1.7 | 1.2 | 1.27 | 1.07 | 1.44 | 1.17 |
| Volatility (weight loss in percent after 24 hr. at 110° C.) | .24 | .75 | .29 | 1.0 | .20 | .68 |
| Water absorption (percent, 24 hr. immersion in water) | 1.55 | 1.40 | 1.51 | 1.38 | 1.62 | 1.47 |
| Material leached out (percent, 24 hr. immersion in water) | .51 | .43 | .32 | .35 | .38 | .34 |
| Exudation (24 hr. at 144° F. and 88% R.H.) | | | none | none | none | none |

Thus, the present invention provides a new class of esters having such properties as high thermal and hydrolytic stability, which properties make the subject esters especially useful in synthetic lubricant compositions and as plasticizers in cellulosic resins.

Although the invention has been described in considerable detail with reference to certain preferred embodiments thereof, it will be understood that variations and modifications can be effected within the spirit and scope of the invention as described hereinabove and as defined by the appended claims.

This application is a continuation-in-part of our copending application titled "Esters of 2,2,4,4-Tetraalkyl-cyclo-Butane-1,3-Diols," U.S. Serial No. 805,731 filed April 13, 1959 and now abandoned, and our copending application titled "Plasticized Polyvinyl Chloride Resins," U.S. Serial No. 842,597 filed September 28, 1959.

We claim:
1. An ester having the formula

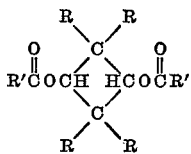

wherein R is a lower alkyl radical having 1 to 4 carbon atoms, and wherein R' is selected from the group consisting of hydrogen atoms and alkyl radicals.

2. An ester having the formula

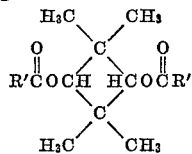

wherein R' is selected from the group consisting of hydrogen atoms and alkyl radicals having 1 to 12 carbon atoms.

3. An ester having the formula

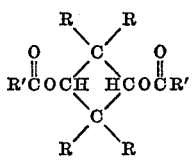

wherein R is an alkyl radical having 1 to 2 carbon atoms, and wherein R' is an alkyl radical having 1 to 12 carbon atoms.

4. An ester having the formula

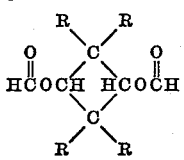

wherein R is an alkyl radical having 1 to 2 carbon atoms.
5. 2,2,4,4-tetramethylcylobutane-1,3-diol dipelargonate.
6. 2,2,4,4 - tetramethylcyclobutane-1,3-diol bis(2-ethyl hexanoate).
7. 2,2,4,4-tetramethylcyclobutane-1,3-diol diisobutyrate.
8. 2,2,4,4-tetramethylcyclobutane-1,3-diol di-n-butyrate.
9. 2,2,4,4-tetramethylcyclobutane-1,3-diol diacetate.

References Cited in the file of this patent
UNITED STATES PATENTS 2,628,249  Bruno _____ Feb. 10, 1953
2,936,324  Hasek et al. _____ May 10, 1960